(12) United States Patent
Bunker, II

(10) Patent No.: US 10,926,342 B2
(45) Date of Patent: Feb. 23, 2021

(54) SAW DUST COLLECTION SYSTEM FOR PANEL AND OTHER SAWS

(71) Applicant: INNOVATIONS MANUFACTURING, INC., Denver, CO (US)

(72) Inventor: Owen Woodruff Bunker, II, Denver, CO (US)

(73) Assignee: INNOVATIONS MANUFACTURING, INC., Denver, CO (US)

( * ) Notice: Subject to any disclaimer, the term of this patent is extended or adjusted under 35 U.S.C. 154(b) by 60 days.

(21) Appl. No.: 15/890,875

(22) Filed: Feb. 7, 2018

(65) Prior Publication Data

US 2018/0369940 A1   Dec. 27, 2018

Related U.S. Application Data

(60) Provisional application No. 62/455,792, filed on Feb. 7, 2017.

(51) Int. Cl.
| | |
|---|---|
| *B23D 59/00* | (2006.01) |
| *B23Q 11/00* | (2006.01) |
| *B27G 19/02* | (2006.01) |
| *B27B 5/07* | (2006.01) |

(52) U.S. Cl.
CPC ........ *B23D 59/006* (2013.01); *B23Q 11/0046* (2013.01); *B27B 5/07* (2013.01); *B27G 19/02* (2013.01)

(58) Field of Classification Search
CPC ..... B23D 59/006; B23Q 11/0046; B27B 5/07; B27G 19/02
See application file for complete search history.

(56) References Cited

U.S. PATENT DOCUMENTS

| | | | | |
|---|---|---|---|---|
| 6,058,819 A | * | 5/2000 | Binder ................ | B23D 59/006 83/100 |
| 2006/0032356 A1 | * | 2/2006 | Newman, Jr. ........ | B23D 45/046 83/486 |
| 2006/0107809 A1 | * | 5/2006 | Powell ................ | B23D 59/006 83/100 |

FOREIGN PATENT DOCUMENTS

EP    0561742 B1 * 10/1995 ......... B23Q 11/0046

\* cited by examiner

*Primary Examiner* — Stephen Choi
(74) *Attorney, Agent, or Firm* — Kilpatrick Townsend & Stockton LLP

(57) ABSTRACT

A panel saw is disclosed. The panel saw may include a support element, a frame, a movable saw, and a channel. The support element may support a bottom edge of a panel. The frame may support a face of the panel. The movable saw may cut the panel from a top edge of the panel to the bottom edge. The channel may be in the frame, behind the movable saw, and open toward the face of the panel. The bottommost portion of the channel may include a vacuum connection. The topmost portion of the channel may be open such that when a vacuum source is coupled with the vacuum connection, and the face of the panel is supported by the frame, air moves through the channel from the topmost portion to the vacuum connection.

17 Claims, 6 Drawing Sheets

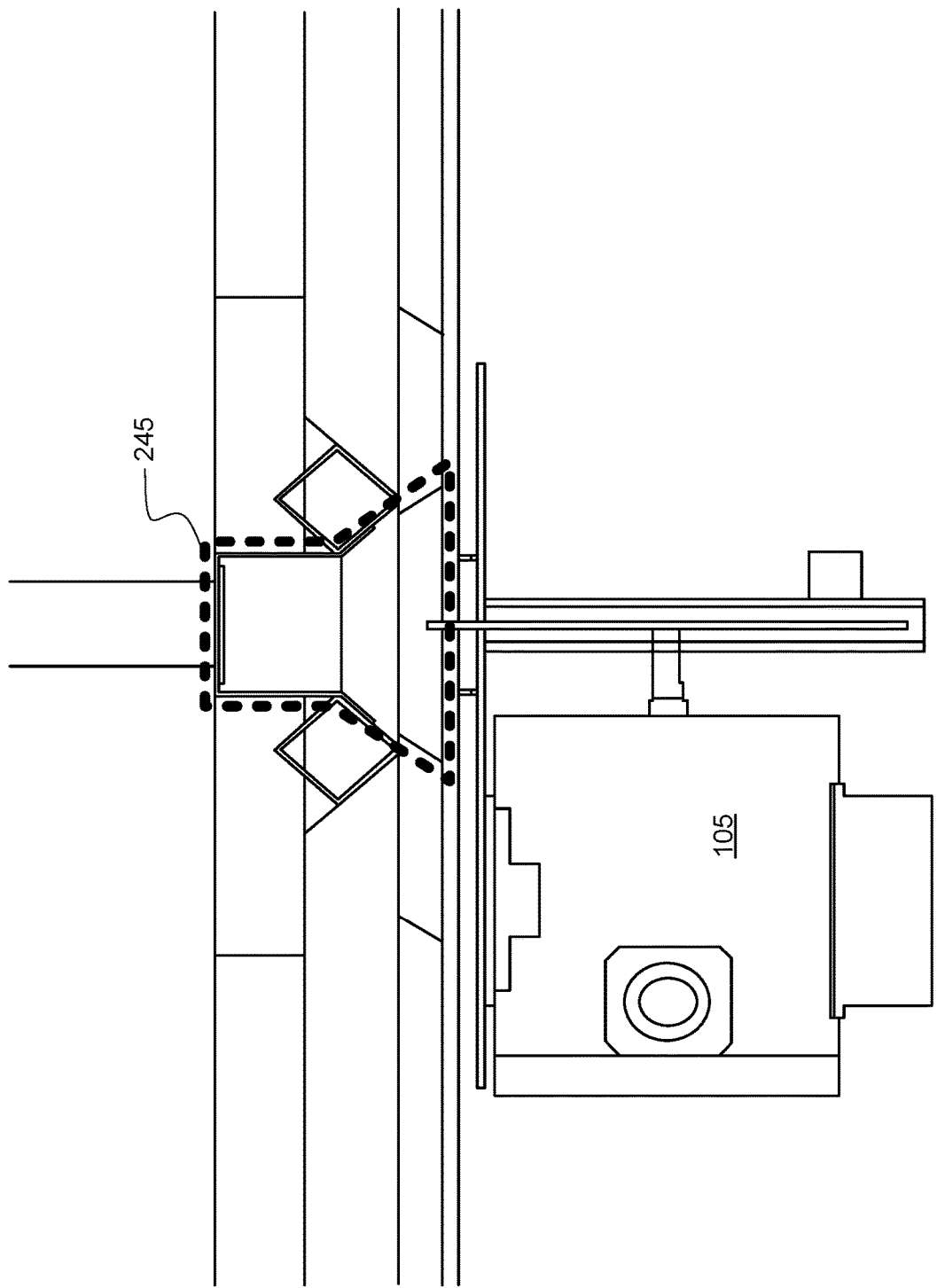

SAW DUST COLLECTION SYSTEM FOR PANEL AND OTHER SAWS

CROSS-REFERENCE TO RELATED APPLICATIONS

This application claims priority to, and the benefit of, U.S. Provisional Patent Application No. 62/455,792, filed Feb. 7, 2017, the entire contents of which are hereby incorporated by reference, for all purposes, as if fully set forth herein.

BRIEF SUMMARY OF THE INVENTION

In one embodiment, a panel saw is provided. The panel saw may include a support element, a frame, a movable saw, and a channel. The support element may support a bottom edge of a panel. The frame may support a face of the panel. The movable saw may cut the panel from a top edge of the panel to the bottom edge. The channel may be in the frame, behind the movable saw, and open toward the face of the panel. The bottommost portion of the channel may include a vacuum connection. The topmost portion of the channel may be open such that when a vacuum source is coupled with the vacuum connection, and the face of the panel is supported by the frame, air moves through the channel from the topmost portion to the vacuum connection.

In another embodiment a panel saw is provided. The panel saw may include a frame, a movable saw, and a channel. The frame may support a face of the panel. The movable saw may cut the panel between a top edge of the panel and the bottom edge of the panel. The channel may be in the frame, behind the movable saw, and open toward the face of the panel. A bottommost portion of the channel may include a vacuum connection. The topmost portion of the channel may be open such that when a vacuum source is coupled with the vacuum connection, and the face of the panel is supported by the frame, air moves through the channel from the topmost portion to the vacuum connection.

In another embodiment, a panel saw is provided. The panel saw may include a frame, a movable saw, and a channel. The frame may support a face of the panel. The movable saw may cut the panel. The channel may be in the frame, behind the movable saw, and open toward the face of the panel. The bottommost portion of the channel may include a vacuum connection. The topmost portion of the channel may be open such that when a vacuum source is coupled with the vacuum connection, and the face of the panel is supported by the frame, air moves through the channel from the topmost portion, and through a cut in the panel made by the saw, to the vacuum connection.

BRIEF SUMMARY OF THE INVENTION

Embodiments of the present invention are described in conjunction with the appended figures:

FIG. 2A is the plan view of FIG. 2, illustrating the air channel or duct formed by the channel, frame, and work piece;

Figure 1:
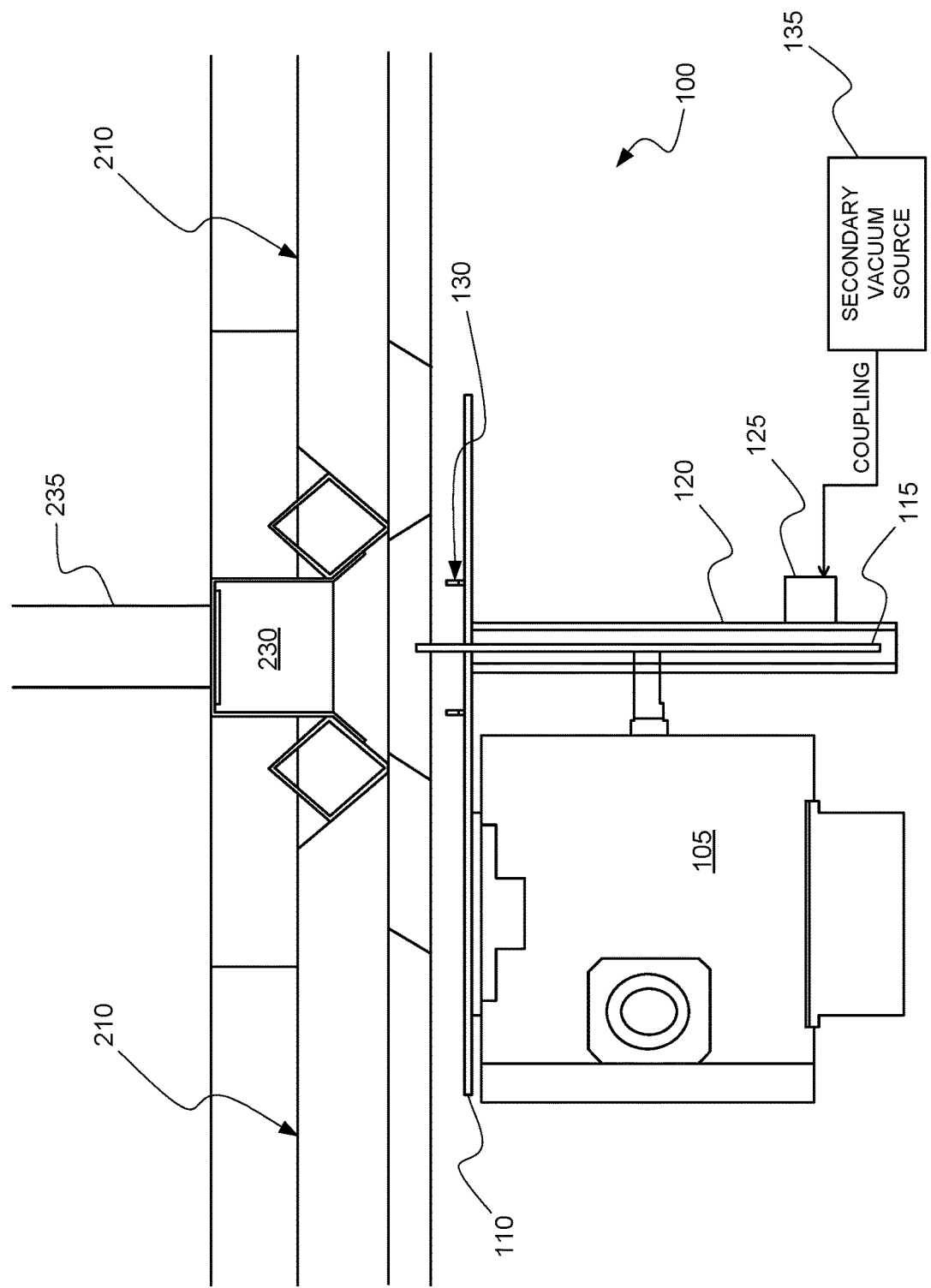
FIG. 1 is a plan view of one embodiment of a panel saw of the invention before a work piece to be cut is inserted into place.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth herein.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, various processes, structures, techniques, and other elements in various embodiments may be discussed or shown without unnecessary detail in order to avoid obscuring the embodiments.

Embodiments of the present invention solve problems related to dust collection in cutting saws, routers, and other cutting and milling operations. Many embodiments solve particular problems, such as those more specifically discussed herein, which relate to existing panel saws in the art. However, it will be appreciated after a reading of this disclosure that the same systems and methods discussed herein in relation to panel saws may also be employed in relation to other saws.

Panel saws employ a rotating saw blade having a rotational axis parallel to the ground to make vertical cuts through panels. The saw is coupled to one or more vertical rails which slides substantially vertically across the front of a panel standing on its edge and supported from its backside. Substantially vertically includes embodiments which have a leaning angle to them in order to support a face of the panel against a frame of the panel saw, and therefore provide a more stable cut.

The blade cuts through the panel leaving one piece of the panel to the left of the saw, and another piece of the panel to the right of the saw. Typical dust collection systems (i.e., vacuum sources) are attached to a shroud around the blade housing on the front side of the saw. Air is pulled from around the blade as it cuts, drawing dust and debris (collectively referred to herein as "dust") away from the saw. In some embodiments, the rotational axis of the blade may be rotated, usually by rotating the entire saw/motor mechanism, so that horizontal, rather than vertical cuts, may be made across the panel. In these embodiments, the saw may remain stationary while the panel is pushed through, however, the saw will still cut over the channel so that dust may be collected. "Dust" could be any particulate or airborne matter of which the panel is comprised of, and which is produced once the panel is cut or otherwise milled.

The problem with this approach to dust collection is that it is not very efficient at pulling dust generated on the back side of the panel into the collection system. Because the only route for such dust to enter a standard front-side collection system is to be drawn through the narrow cut on the trailing edge of the saw as it passes through the panel, most dust on the back side of the panel becomes airborne particulate matter or collects gradually on the backside of the system. Embodiments of the present invention provide solutions to these and other issues.

Figure 2:
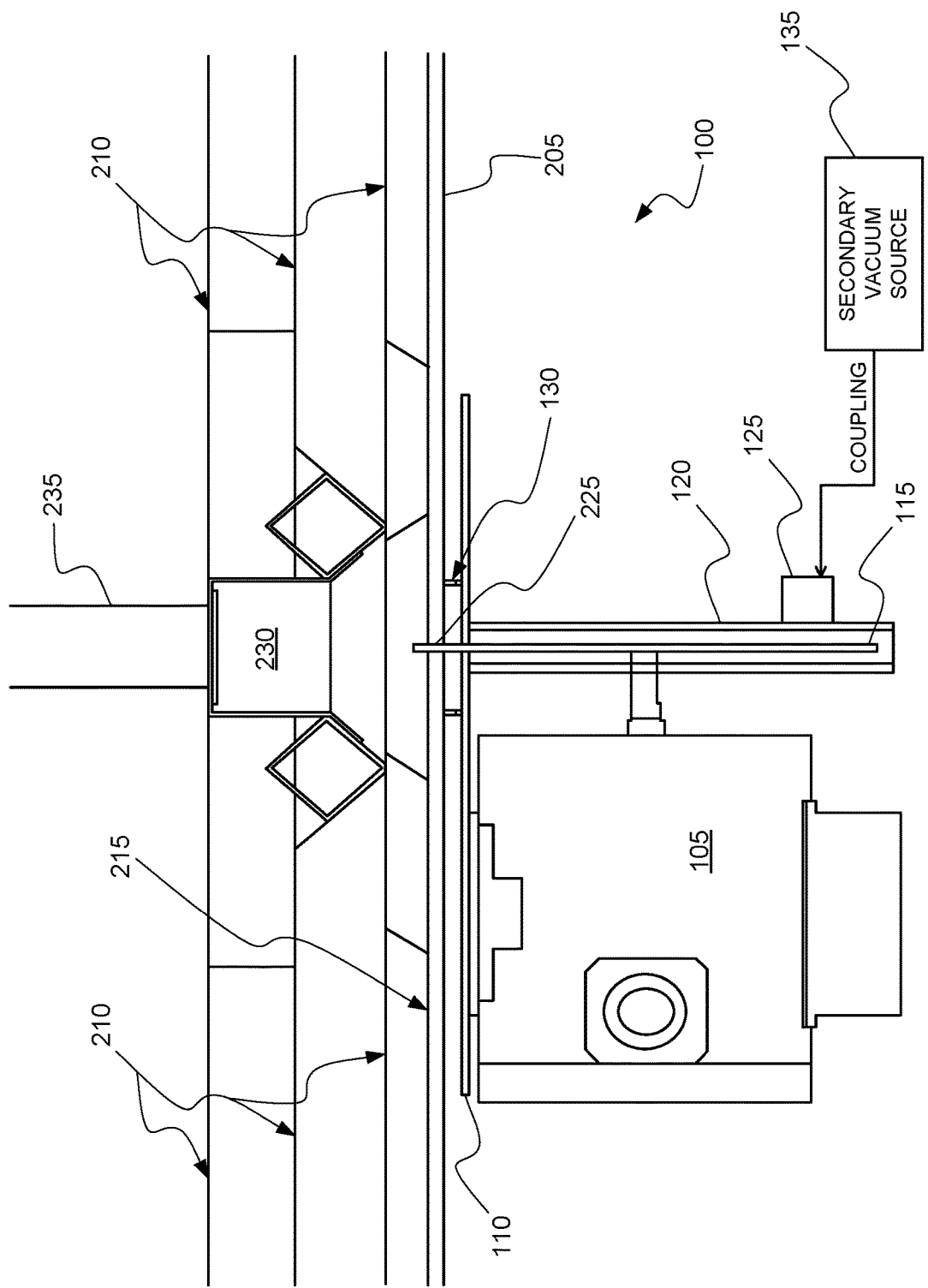
FIG. 2 is a plan view of one embodiment of a panel saw of the invention after a work piece to be cut is inserted into place.

FIG. 1 shows a plan view of one embodiment 100 of the invention before a work piece to be sawed is inserted into place. The saw motor 105 is mounted to a motor mount plate 110, and the saw blade 115 has a housing 120 surrounding it with a vacuum hose connection 125 for a front-side dust collection system (a secondary vacuum source 135 is shown diagrammatically coupled therewith). Brushes 130 on the backside of motor mount plate 110 allow for a semi-sealing effect against the work piece once inserted as shown in FIG. 2 (work piece 205 is the "panel being cut" in FIG. 2), and therefore higher vacuum pressure. FIG. 2A shows the semi-sealed air channel or duct 245 formed by panel 205, channel 230, and portions of frame 210.

Figure 3:
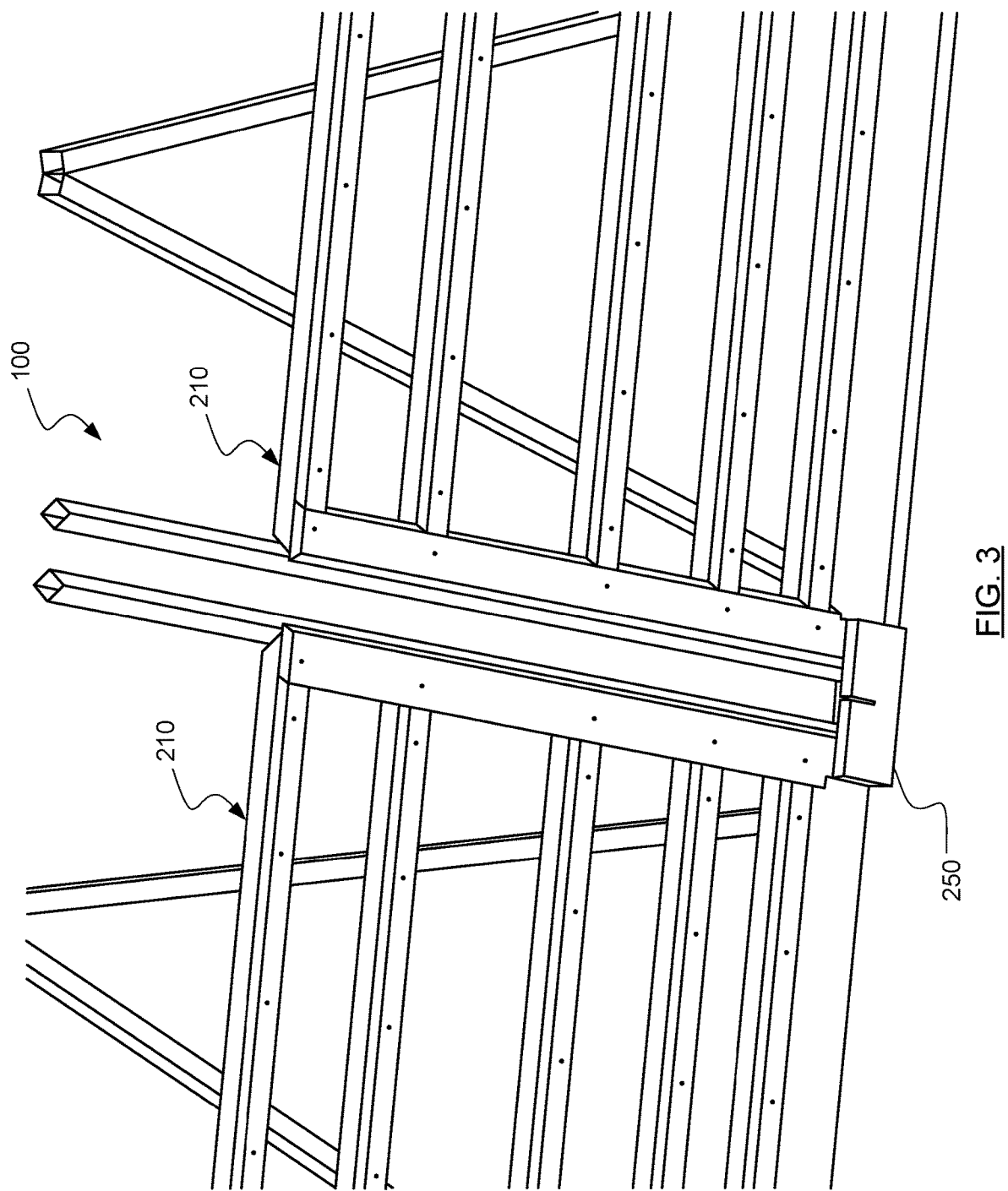
FIG. 3 shows the saw frame of FIGS. 1 and 2, without a dust chute.
Figure 4:
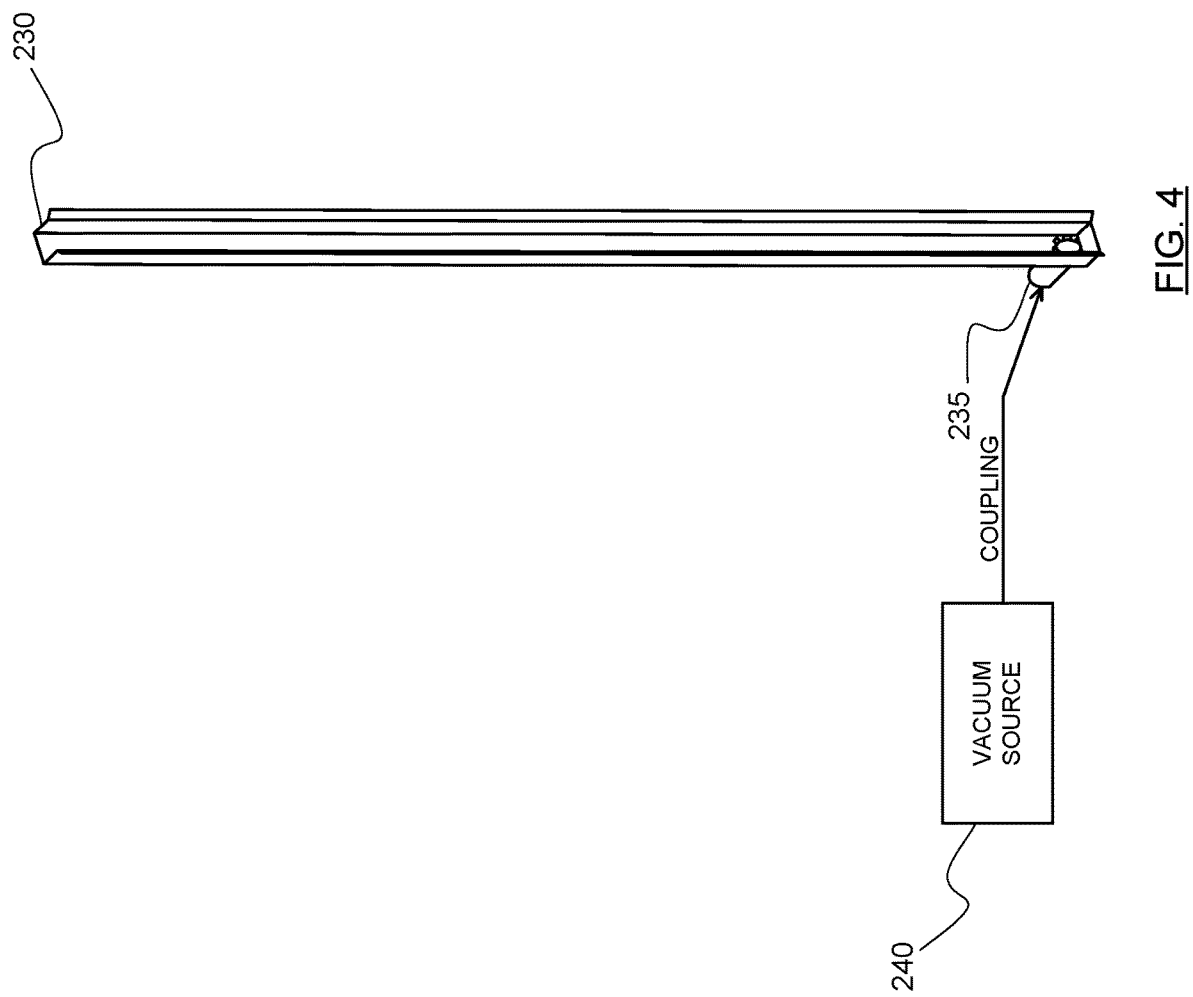
FIG. 4 shows the dust chute alone of FIGS. 1 and 2.
Figure 5:
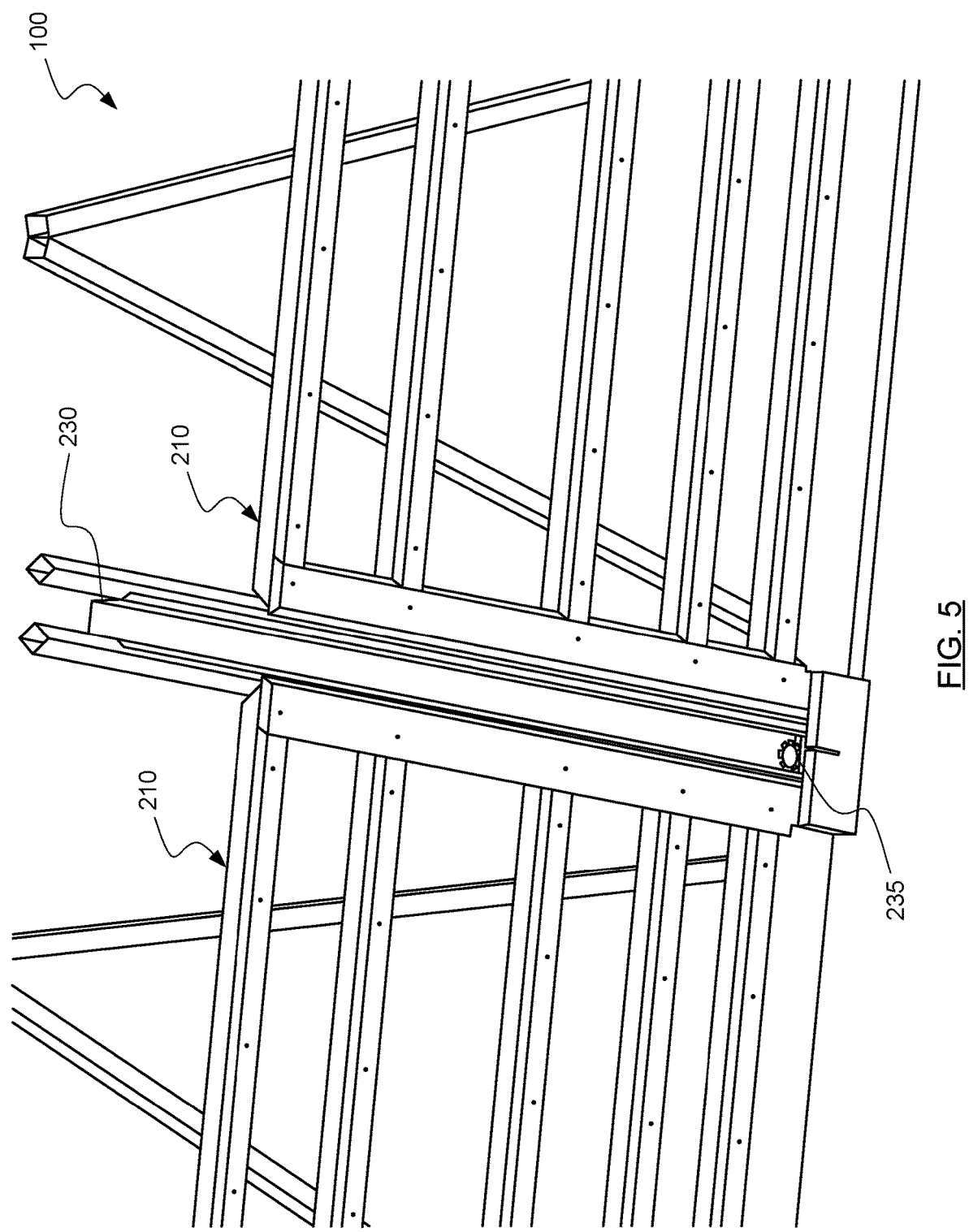
FIG. 5 shows a saw frame with a dust chute inserted therein.

Also present in FIG. 1 and FIG. 2 is the saw frame 210 against which the work piece 205 is placed (frame 210 usually leans at a slight angle so that a face 215 of work piece 205 lays against it). Frame 210 includes two elements, one on either side of the blade cut 225, which support a channeled dust chute 230. FIG. 3 shows saw frame 210 without dust chute 230, FIG. 4 shows dust chute 230 alone, and FIG. 5 shows saw frame 210 with dust chute 230 inserted. Dust chute includes a vacuum hose connection 235 which allows a dust collection system (i.e., vacuum source 240 (diagrammatically shown)) to be coupled therewith. This allows a vacuum to be created on the back side of work piece 205 along the vertical line on which the saw will cut work piece 205.

As saw blade 115 goes down work piece 205 from its initial starting position (as supported by cutting block 250 (i.e., support element) and/or other elements not shown), air would be pulled from vacuum hose connection 235 drawing dust from the backside of work piece 205 downward and into a vacuum source/collection system. Air would be pulled into dust chute 230 from the top-most portion thereof being open to the atmosphere, both at the axial end of channel/chute 230, and from a front face thereof (where saw blade 115 is parked during, and just prior to use; use commonly being downward cuts across work piece 205).

In this manner, dust is collected from both the front and back of the frame/saw/apparatus. From the front via saw blade housing 120, and from the back via dust chute 230. Work piece 205 provides a front "seal" of dust chute channel 230 while it is in place (thereby creating a passageway through which the vacuum source may draw air), and while the downward cut in work piece 230 will gradually decrease the sealing of the dust chute by the work piece above the saw, the point of dust generation (where saw blade 115 is cutting through work piece 205) is closer to the vacuum hose connection 230 at the bottom as the cut grows larger. The same benefits discussed above may also be enjoyed when the panel saw 100 is used in the horizontal cut configuration, where the cut-line runs parallel with the ground (i.e., the panel saw 100 will be reoriented for such configurations).

In some embodiments, dust collection systems as described herein may also be applied to differently oriented saws (i.e., horizontal saws such as miter saws) and/or other similar devices such as milling devices, including routers (whether the router/etc. is cutting through an entirety of the work piece, or just modifying an edge of the work piece). For the purposes, a "saw" includes all such devices.

The invention has now been described in detail for the purposes of clarity and understanding. However, it will be appreciated that certain changes and modifications may be practiced within the scope of the appended claims.

What is claimed is:

1. A panel saw comprising:
   a support element to support a bottom edge of a panel, wherein the support element comprises a vertical slit;
   a frame to support a face of the panel;
   a movable saw to cut the panel from a top edge of the panel to the bottom edge, wherein the movable saw comprises a blade having a width that substantially matches a width of the vertical slit; and
   a channel in the frame, behind the movable saw, and open toward the face of the panel, wherein:
      a bottommost portion of the channel comprises a vacuum connection;
      a topmost portion of the channel is open such that when a vacuum source is coupled with the vacuum connection, and the face of the panel is supported by the frame, air moves through the channel from the topmost portion to the vacuum connection;
      a top surface of the support element is positioned relative to the frame at a height above the bottommost portion of the channel and beyond a width of the channel such that the support element supports the bottom edge of the panel at positions that are beyond the width of the channel and at heights above the base of the channel; and
      the bottommost portion of the channel is closed except at the vertical slit and toward the face of the panel and the vacuum connection such that when a bottommost edge of the panel is positioned atop the support element, the channel is closed except for the vertical slit and at the open topmost portion of the channel, the vacuum connection, and through any cut made in the panel by the movable saw so as to provide a semi-sealed air channel behind the panel.

2. The panel saw of claim 1, wherein:
   the topmost portion of the channel extends above the panel.

3. The panel saw of claim 2, wherein:
   the topmost portion of the channel is open at an end of the channel and facing the movable saw when the movable saw is in a topmost position.

4. The panel saw of claim 1, further comprising:
   a secondary vacuum source in communication with at least a portion of the movable saw.

5. The panel saw of claim 1, further comprising:
   the vacuum source.

6. The panel saw of claim 1, wherein:
   when the vacuum source is coupled with the vacuum connection, the face of the panel is supported by the frame, and the movable saw has made a cut in at least a portion of the panel, air moves through the cut to the vacuum connection.

7. The panel saw of claim 1, wherein:
the channel comprises a dust chute having a rear surface that faces away from the panel, the rear surface being supported by the frame.

8. The panel saw of claim 1, wherein:
the support element seals a front section of the bottommost portion of the channel except for the vertical slit.

9. The panel saw of claim 1, wherein:
the support element is sized and positioned to support a medial portion of the bottommost edge of the panel at positions immediately adjacent the vertical slit.

10. A panel saw comprising:
a frame to support a face of the panel;
a movable saw to cut the panel between a top edge of the panel and a bottom edge of the panel, wherein the movable saw comprises a blade; and
a channel in the frame, behind the movable saw, and open toward the face of the panel, wherein a bottommost portion of the channel comprises a vacuum connection; and
a support element that is coupled with the frame, the support element comprising a top surface that is positioned relative to the frame at a height above the bottommost portion of the channel and beyond a width of the channel such that the support element supports the bottom edge of the panel at positions that are beyond the width of the channel and at heights above the base of the channel, wherein:
the support element comprises a vertical slit extending through the top surface, the vertical slit having a width that substantially matches a width of the blade;
a topmost portion of the channel is open such that when a vacuum source is coupled with the vacuum connection, and the face of the panel is supported by the frame, air moves through the channel from the topmost portion to the vacuum connection; and
the bottommost portion of the channel is closed except at the vertical slit and toward the face of the panel and the vacuum connection such that when a bottommost edge of the panel is positioned atop the support element, the channel is closed except for the vertical slit and at the open topmost portion of the channel, the vacuum connection, and through any cut made in the panel by the movable saw so as to provide a semi-sealed air channel behind the panel.

11. The panel saw of claim 10, wherein:
the topmost portion of the channel extends above the panel.

12. The panel saw of claim 11, wherein:
the topmost portion of the channel is open at an end of the channel and facing the movable saw when the movable saw is in a topmost position.

13. The panel saw of claim 10, wherein:
when the vacuum source is coupled with the vacuum connection, the face of the panel is supported by the frame, and the movable saw has made a cut in at least a portion of the panel, air moves through the cut to the vacuum connection.

14. A panel saw comprising:
a frame to support a face of the panel;
a saw to cut the panel, the saw comprising a blade;
a channel in the frame, behind the saw, and open toward the face of the panel, wherein a bottommost portion of the channel comprises a vacuum connection; and
a support element that is coupled with the frame, the support element comprising a top surface that is positioned relative to the frame at a height above the bottommost portion of the channel and beyond a width of the channel such that the support element supports a bottom edge of the panel at positions that are beyond the width of the channel and at heights above the base of the channel, wherein:
the support element comprises a vertical slit extending through the top surface, the vertical slit having a width that substantially matches a width of the blade;
the channel has a cross-sectional area that is larger than a cross-sectional area of the vertical slit;
a topmost portion of the channel is open such that when a vacuum source is coupled with the vacuum connection, and the face of the panel is supported by the frame, air moves through the channel from the topmost portion, and through a cut in the panel made by the saw, to the vacuum connection; and
the bottommost portion of the channel is closed except at the vertical slit and toward the face of the panel and the vacuum connection such that when a bottommost edge of the panel is positioned atop the support element, the channel is closed except for the vertical slit and at the open topmost portion of the channel, the vacuum connection, and through any cut made in the panel by the saw so as to provide a semi-sealed air channel behind the panel.

15. The panel saw of claim 14, wherein:
the topmost portion of the channel extends above the panel.

16. The panel saw of claim 15, wherein:
the topmost portion of the channel is open at an end of the channel and facing the saw when the saw is in a topmost position.

17. The panel saw of claim 14, further comprising:
a secondary vacuum source in communication with at least a portion of the saw.

* * * * *